United States Patent
Langer et al.

(10) Patent No.: US 8,828,469 B2
(45) Date of Patent: Sep. 9, 2014

(54) USE OF ALKAMIDES FOR MASKING AN UNPLEASANT FLAVOR

(75) Inventors: Kathrin Langer, Dassel-Hilwartshausen (DE); Jakob Ley, Holzminden (DE); Gerald Reinders, Höxter (DE); Günter Kindel, Höxter (DE); Gerhard Krammer, Holzminden (DE)

(73) Assignee: Symrise AG, Holzminden (DE)

( * ) Notice: Subject to any disclaimer, the term of this patent is extended or adjusted under 35 U.S.C. 154(b) by 1616 days.

(21) Appl. No.: 12/266,209

(22) Filed: Nov. 6, 2008

(65) Prior Publication Data

US 2009/0124701 A1    May 14, 2009

Related U.S. Application Data

(60) Provisional application No. 60/986,343, filed on Nov. 8, 2007.

(51) Int. Cl.

| | |
|---|---|
| *A23L 1/22* | (2006.01) |
| *A23L 2/56* | (2006.01) |
| *A61K 8/18* | (2006.01) |
| *A61Q 13/00* | (2006.01) |
| *A23G 9/32* | (2006.01) |
| *A23G 1/32* | (2006.01) |
| *A21D 2/24* | (2006.01) |
| *A23C 9/13* | (2006.01) |
| *A23C 11/10* | (2006.01) |

(52) U.S. Cl.
CPC ............... *A23L 1/22075* (2013.01); *A23G 9/32* (2013.01); *A23G 1/32* (2013.01); *A21D 2/24* (2013.01); *A23L 1/22083* (2013.01); *A23C 9/1307* (2013.01); *A23C 11/103* (2013.01)
USPC .............................................. 426/534; 512/26

(58) Field of Classification Search
None
See application file for complete search history.

(56) References Cited

U.S. PATENT DOCUMENTS

| | | | | |
|---|---|---|---|---|
| 7,482,479 | B2 * | 1/2009 | Gatfield et al. ................. | 554/69 |
| 7,776,923 | B2 * | 8/2010 | Gatfield et al. ............... | 514/626 |
| 8,063,107 | B2 * | 11/2011 | Gatfield et al. ............... | 514/626 |
| 2004/0202619 | A1 | 10/2004 | Dewis et al. | |
| 2004/0241312 | A1 * | 12/2004 | Gatfield et al. ............... | 426/650 |
| 2006/0057268 | A1 | 3/2006 | Dewis et al. | |
| 2008/0227867 | A1 | 9/2008 | Ley et al. | |

FOREIGN PATENT DOCUMENTS

| | | |
|---|---|---|
| DE | 102004041496 A1 | 3/2006 |
| EP | 1977655 | 10/2008 |
| JP | 2000287630 | 10/2000 |
| JP | 2001046037 | 2/2001 |
| JP | 2003128664 | 5/2003 |
| JP | 2004315441 | 11/2004 |
| JP | 2004337132 | 12/2004 |
| JP | 2005145933 | 6/2005 |
| JP | 2007135481 | 6/2007 |
| WO | WO-03022065 | 3/2003 |
| WO | WO-2004000787 | 12/2003 |
| WO | WO-2004043906 | 5/2004 |
| WO | WO-2004062385 | 7/2004 |
| WO | WO-2005016031 | 2/2005 |
| WO | WO-2005096841 | 10/2005 |
| WO | WO-2006013930 | 2/2006 |

OTHER PUBLICATIONS

Ley et al., Stereoselective Enzymatic Synthesis of cis-Pellitorine, a Taste Active Alkamide Naturally Occurring in Tarragon, Eur. J. Org. Chem. 2004, 5135_5140.*
I. Lesschaeve, et al., Polyphenols: factor influencing their sensory properties and their effects on food and beverage preferences, *American Journal of Clinical Nutrition* 2005, vol. 81 (suppl.), pp. 330S-335S.
N. Hayashi, et al., Reduction of Catechin Astringency by the Complexation of Gallate-Type Catechins with Pectin, *Biosci. Biotechnol. Biochem.*, 2005, vol. 69 (7), pp. 1306-1310.

* cited by examiner

*Primary Examiner* — James D Anderson
*Assistant Examiner* — William Lee
(74) *Attorney, Agent, or Firm* — Dilworth & Barrese, LLP

(57) ABSTRACT

An individual alkamide and/or a mixture having two or more different alkamides, is disclosed for changing, masking or reducing the unpleasant flavor impression of an unpleasant-tasting substance or mixture of substances. The alkamide can be trans-pellitorine; cis-pellitorine; 2Z,4Z- or 2Z,4E-decadienoic acid-N-isobutylamide; 2E,4E-decadienoic acid-N-([2S]-2-methylbutyl)amide; 2E,4E-decadienoic acid-N-([2R]-2-methylbutylamide); 2E,4Z-decadienoic acid-N-(2-methylbutyl)amide; achilleamide; sarmentine; 2E- or 3E-decenoic acid-N-isobutylamide; 3E-nonenoic acid-N-isobutylamide; spilanthol; homospilanthol; 2E,6Z,8E-decatrienoic acid-N-([2R]-2-methylbutyl)amide; 2E- or 2Z-decen-4-oic acid-N-isobutylamide; α-sanshool; α-hydroxysanshool; γ-hydroxysanshool; γ-hydroxysanshool; γ-hydroxyisosanshool; γ-dehydrosanshool; γ-sanshool; bungeanool; isobungeanool; dihydrobungeanool; or tetrahydrobungeanool, or combinations thereof.

14 Claims, No Drawings

USE OF ALKAMIDES FOR MASKING AN UNPLEASANT FLAVOR

CROSS-REFERENCE TO RELATED APPLICATION

This application claims benefit of priority to U.S. Provisional Application No. 60/986,343, filed on Nov. 8, 2007, which is incorporated herein by reference in its entirety.

The invention relates to the use of specific alkamides, in particular unsaturated alkamides and mixtures thereof, for masking or reducing unpleasant flavor impressions, in particular the flavor impressions astringent, dry, dusty, floury, chalky and/or metallic. The invention further relates to specific preparations containing an active content of said alkamides or mixtures thereof.

Food products or luxury food products often contain various astringent-acting substances (astringents) which, despite on the one hand being desirable and characteristic to a certain degree (for example in tea/coffee, catechins in tea or chlorogenic acid in coffee), can on the other hand also greatly reduce the value (for example flavonoid glycosides and limonoids in citrus juices, bitter/astringent aftertaste of many artificial sweeteners such as aspartame or saccharin, hydrophobic amino acids and/or peptides in cheese, saponins and proteins in soy products).

Astringent flavor is generally caused by the precipitation of proline-rich proteins in saliva by astringents, for example metal salts or tannins. Homogeneous saliva, which normally serves as a "lubricant", contains denatured proteins which lower lubrication and as a result leave in the mouth a sensation which is felt to be astringent (Isabelle Lesschaeve and Ann C. Noble, *American Journal of Clinical Nutrition* 2005, 81, 330S-335S).

In particular greatly fat-reduced products (for example fat-reduced or fat-free dairy products, in particular yoghurt or cream cheese, emulsion-based systems such as mayonnaise) often display marked astringency and a reduced mouth feel.

Under EC Regulation (No. 1924/2006), since 1 Jul. 2007, the term "low-fat products" denotes solid food products containing no more than 3 g of fat per 100 g or liquid food products containing no more than 1.5 g of fat per 100 g. Accordingly, food products which are said to be "fat-free" may contain no more than 0.5 g of fat per 100 g or 100 ml.

Accordingly, subsequent treatment is often necessary, in particular for lowering the natural content of astringents, for example by a discardable preinfusion in green tea to remove catechins, or enzymatically, for example treatment of tea with degrading enzymes to destroy the astringent polyphenols, as described in WO 2003 022,065 or JP 2007 135,481, or the use of special peptidases in the maturation of cheese.

These treatments for lowering the natural content of astringents have an adverse effect on the product, produce waste materials and bring about for example also solvent remnants and other residues (enzymes) in the products.

It is therefore desirable to find substances which in the smallest concentrations can effectively suppress or at least reduce unpleasant flavor impressions, in particular astringent, dry, floury, dusty, chalky and/or metallic flavor impressions.

The suppression of unpleasant flavor impressions also in many pharmaceutical active ingredients is particularly important, as this can significantly increase the willingness of patients, in particular in children, orally to consume the preparation containing the active ingredient. Many pharmaceutical active ingredients, for example aspirin, salicin, paracetamol, ambroxol or quinine, to name just a very small selection for the purposes of illustration, have a pronounced astringent and/or metallic flavor and/or aftertaste.

Fat emulsions are conventionally used as counteragents to astringents; however, the use of such agents is in many cases not indicated, i.e. for example in fat-free beverages or health-conscious low-fat products.

JP 2000 287,630 and WO 2006 013,930 describe a method for reducing the astringent flavor of polyphenols in tea beverages using sugar and specific amino acids. In this case, the amino acids are used in the range of from 0.04 to 0.1%.

In JP 2001 046,037, the astringent flavor of polyphenols is reduced using starch and proteins. However, this method has the drawback that in particular proteins and starches have a major influence on the rheological properties of the products.

In JP 2003 128,664, the astringency is reduced by the formation of salts of the polyphenols. Unfortunately, in many cases, this reduces the stability of these compounds and increases the susceptibility thereof to oxidation.

JP 2004 315,441 discloses that the astringent flavor of iron salts can be reduced using special amino acids such as γ-aminobutyric acid. However, the necessary use of extremely high concentrations (1% and more) lends the product or the preparation a sour flavor.

Special sugars such as palatinose, also in combination with sweeteners, have been proposed to mask the astringency of soy beverages (WO 2004 062,385); nevertheless, in this case too, very large amounts are required. WO 2005 016,031 proposes non-reducing disaccharides such as trehalose as astringency maskers. JP 2004 337,132 describes masking with cyclofructans which mask the astringent substances by complexing. According to JP 2005 145,933, relatively high concentrations (>0.1%) of pectin or alginates are also capable of reducing the astringency of polyphenols, for example from grape seed extracts. Gallate catechins, such as are found for example in green tea, have also been masked using this method (N. Hayashi, T. Ujihara and K. Kohata, Biosci. Biotechnol. Biochem. 2005, 69 (7), 1306-1310).

In some cases, sweeteners are also used to reduce astringency, as described for example in JP 2007 135,481. However, in principle, only sweet applications are obtained in this way.

The above-mentioned, known methods often have, in addition to the drawbacks mentioned hereinbefore, a further drawback in that the masking agents are intended to be used in significant amounts (>0.05% range); this can lead to problems of cost and, in the case of polymeric carbohydrates or proteins, of application.

The primary object of the present invention was to find substances which (a) are suitable in very small amounts for masking or reducing the unpleasant flavor impression of unpleasant-tasting substances (and preferably display in particular an astringency-masking effect for a large number of astringents), (b) are broadly applicable, (c) are easily accessible and (d) ideally are naturally occurring.

Corresponding substances having all of the aforementioned properties will be described hereinafter.

Accordingly, to achieve the aforementioned object, use is made of
    individual alkamides
and/or
    a mixture comprising or consisting of two or more different alkamides
for changing, in particular for masking or reducing the unpleasant flavor impression of an unpleasant-tasting substance. In this case, the individual alkamide or one, a plurality of or all the alkamides in the mixture are selected from the group consisting of 2E,4E-decadienoic acid-N-isobutylamide (trans-pellitorine); 2E,4Z-decadienoic acid-N-isobutylamide (cis-pellitorine); 2Z,4Z-decadienoic acid-N-isobutylamide; 2Z,4E-decadienoic acid-N-isobutylamide; 2E,4E-decadienoic acid-N-([2S]-2-methylbutyl)amide; 2E,4E-decadienoic acid-N-([2S]-2-methylbutyl)amide; 2E,4E-decadienoic acid-N-([2R]-2-methylbutylamide); 2E,4Z-decadienoic acid-N-(2-methylbutyl)amide; 2E,4E-decadienoic acid-N-piperide (achilleamide); 2E,4E-decadienoic acid-N-piperide (sarmentine); 2E-decenoic acid-N-isobutylamide; 3E-decenoic acid-N-isobutylamide; 3E-nonenoic acid-N-isobutylamide; 2E,6Z,8E-decatrienoic acid-N-isobutylamide (spilanthol); 2E,6Z,8E-decatrienoic acid-N-([2S]-2-methylbutyl)amide (homospilanthol); 2E,6Z,8E-decatrienoic acid-N-([2R]-2-methylbutyl)amide; 2E-decen-4-oic acid-N-isobutylamide; 2Z-decen-4-oic acid-N-isobutylamide; 2E,6Z,8E,10E-dodecatetraenoic acid-N-(2-methylpropyl)amide (α-sanshool); 2E,6Z,8E,10E-dodecatetraenoic acid-N-(2-hydroxy-2-methylpropyl)amide (α-hydroxysanshool); 2E,6E,8E,10E-dodecatetraenoic acid-N-(2-hydroxy-2-methylpropyl)amide (γ-hydroxysanshool); 2E,4E,8Z,10E,12E-tetradecapentaenoic acid-N-(2-hydroxy-2-methylpropyl)amide (γ-hydroxysanshool); 2E,4E,8E,10E,12E-tetradecapentaenoic acid-N-(2-hydroxy-2-methylpropyl)amide (γ-hydroxyisosanshool); 2E,4E,8Z,10E,12E-tetradecapentaenoic acid-N-(2-methyl-2-propenyl)amide (γ-dehydrosanshool); 2E,4E,8Z,10E,12E-tetradecapentaenoic acid-N-(2-methylpropyl)amide (γ-sanshool); 2E,4E,8Z,11Z-tetradecatetraenoic acid-N-(2-hydroxy-2-methylpropyl)amide (bungeanool); 2E,4E,8Z,11E-tetradecatetraenoic acid-N-(2-hydroxy-2-methylpropyl)amide (isobungeanool); 2E,4E,8Z-tetradecatrienoic acid-N-(2-hydroxy-2-methylpropyl)amide (dihydrobungeanool) and 2E,4E-tetradecadienoic acid-N-(2-hydroxy-2-methylpropyl)amide (tetrahydrobungeanool).

Tests carried out by the Applicant have revealed that for the aforementioned use according to the invention, use is particularly suitably made of alkamides selected from the group consisting of 2E,4E-decadienoic acid-N-isobutylamide (trans-pellitorine), 2E,4Z-decadienoic acid-N-isobutylamide (cis-pellitorine), 2Z,4Z-decadienoic acid-N-isobutylamide, 2Z,4E-decadienoic acid-N-isobutylamide, 2E,4E-decadienoic acid-N-piperide (achilleamide), 2E,6Z,8E-decatrienoic acid-N-isobutylamide (spilanthol), 2E,6Z,8E-decatrienoic acid-N-([2S]-2-methylbutyl)amide (homospilanthol), 2E,6Z,8E-decatrienoic acid-N-([2R]-2-methylbutyl)amide, 2E,6Z,8E,10E-dodecatetraenoic acid-N-(2-methylpropyl)amide (α-sanshool), 2E,6Z,8E,10E-dodecatetraenoic acid-N-(2-hydroxy-2-methylpropyl)amide (α-hydroxysanshool), 2E,4E,8Z,10E,12E-tetradecapentaenoic acid-N-(2-methylpropyl)amide (γ-sanshool) and 2E,4E,8Z,11Z-tetradecatetraenoic acid-N-(2-hydroxy-2-methylpropyl)amide (bungeanool). The aforementioned alkamides are all naturally occurring.

Tests carried out by the Applicant have revealed that the best effect within the use which is according to the invention as described above, and thus the best properties in the sense of the object to be achieved, are displayed by the following alkamides: 2E,4E-decadienoic acid-N-isobutylamide (trans-pellitorine) of Formula (1), 2E,4Z-decadienoic acid-N-isobutylamide (cis-pellitorine) of Formula (2), 2Z,4Z-decadienoic acid-N-isobutylamide of Formula (3) and 2Z,4E-decadienoic acid-N-isobutylamide of Formula (4). Accordingly, particularly preferable is a use according to the invention wherein the alkamide or the alkamides are each selected independently of one another from the above-mentioned group.

The compounds of Formulae (1), (2), (3) and (4) are illustrated again for the sake of clarity in the following diagram:

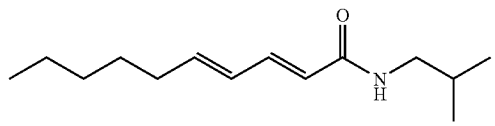

(1)

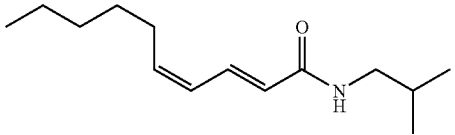

(2)

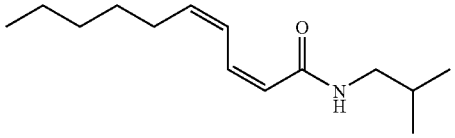

(3)

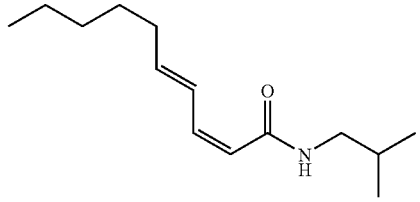

(4)

Accordingly, the tests carried out by us have revealed that that all the above-mentioned alkamides and mixtures are particularly suitable, in accordance with the use according to the invention, for changing, in particular for masking or for reducing an unpleasant flavor of an unpleasant-tasting substance or mixture of substances. That which was stated hereinbefore applies to the suitability of the alkamides and the corresponding selection of the alkamides to be preferred.

In addition, more extensive tests have revealed that the use according to the invention is particularly suitable for changing, in particular for masking or for reducing an astringent flavor or astringent aftertaste of an unpleasant-tasting substance or mixture of substances. Particularly preferred is therefore a use (as defined above) for changing, masking or reducing an astringent flavor of an unpleasant-tasting substance or mixture of substances with one, two, three, four, five or all the flavor impressions astringent, dry, dusty, floury, chalky or metallic.

In the sense of the present invention, corresponding unpleasant flavor impressions, caused by an aftertaste, can be attributed uniformly to the respective unpleasant flavor impressions.

Unpleasant-tasting substances in the sense of the invention are therefore:
substances which taste astringent, dry, dusty, floury, chalky and/or metallic and
substances having an accordingly long-lasting aftertaste.

An astringent flavor impression is in this case often associated with the flavor impressions dry, dusty, floury, chalky and/or metallic.

The aforementioned, unpleasant-tasting substances can also have further, generally not unpleasant flavor and/or odor qualities. Further flavor qualities which are not unpleasant in the sense of the present invention include for example the impressions spicy, umami, sweet, salty, sour, pungent, cooling, warming, burning or tingling.

Selected examples of unpleasant-tasting substances in the sense of the invention are mentioned hereinafter.

Particularly surprisingly, the tests which were carried out revealed that in a use according to the invention as defined above for changing, in particular for masking or reducing the unpleasant flavor impression of an unpleasant-tasting substance or mixture of substances, the total amount used of the alkamide or alkamides is not sufficient to intensify salivation. This was particularly surprising for the alkamides preferably to be selected as defined above. The alkamides and mixtures to be used in accordance with the invention, especially the alkamides defined hereinbefore as being preferred, but in particular trans-pellitorine of Formula (1), had, even in very low concentrations which are not sufficient to intensify salivation, a very strong effect in order to change, in particular to mask or to reduce the unpleasant flavor impression of unpleasant-tasting substances in the sense of the invention. Accordingly, a further preferred use according to the invention is specified, wherein the total amount, used for changing, masking or reducing the unpleasant flavor impression, of the alkamide or alkamides is not sufficient to intensify salivation.

As mentioned hereinbefore, one aspect of the present invention relates to the use of an individual alkamide (as defined hereinbefore) and/or a mixture comprising or consisting of two or more different alkamides (as defined hereinbefore) for changing, in particular masking or reducing an unpleasant flavor impression of an unpleasant-tasting substance or mixture of substances, i.e. as a flavor-masking agent. Preferably, the alkamide to be used in accordance with the invention or the mixture to be used in accordance with the invention is used in a corresponding preparation. A use according to the invention in a pharmaceutical preparation intended to be ingested orally or a preparation used for nutrition, oral care, or consumption for pleasure is accordingly preferred.

Insofar as the present invention relates to a use in corresponding preparations, preparations of the type that are soy-based products and fat-reduced (low-fat) yoghurts are in this case preferably to be selected. Soy-based products in the sense of the invention are in particular products made of soy protein or other soy bean fractions, such as for example soy milk and products produced therefrom, beverages containing isolated or enzymatically treated soy protein, beverages containing soy flour, soy lecithin-containing preparations, fermented products such as tofu or tempeh or products produced therefrom and mixtures with fruit preparations and optionally aromas.

Low-fat yoghurts are to be understood in the sense of fat-reduced or low-fat products and thus to be assigned to the products as defined hereinbefore in accordance with the aforementioned EC Regulation. With regard to the alkamides which are preferably to be used in this case, and the total amount preferably to be used in this case of the alkamide or alkamides, that which was stated hereinbefore applies accordingly.

Furthermore, it has surprisingly been found that the alkamides to be used in accordance with the invention, in particular those defined hereinbefore as being preferred and most particularly alkamides of Formula (1), (2), (3) or (4), in combination with one or more aroma substances, preferably aroma substances which impart a milky/creamy flavor impression giving a sensation of fullness in the mouth and/or a sweet, caramel-like flavor impression, particularly effectively change, in particular mask or reduce, the unpleasant flavor of an unpleasant-tasting substance as defined above. These combinations are accordingly to be regarded as further mixtures according to the invention. Accordingly, one aspect of the present invention relates to the use of an individual alkamide or of two or more different alkamides (as defined above), mixed with one or more aroma substances which impart a milky/creamy flavor impression giving a sensation of fullness in the mouth and/or a sweet, caramel-like flavor impression. With regard to the alkamides preferably to be used, that which was stated hereinbefore applies accordingly. Examples of aroma substances preferably to be used are given hereinafter.

Accordingly, in this case too, uses according to the invention in a pharmaceutical preparation intended to be ingested orally or a preparation used for nutrition (in particular soy-based products and fat-reduced (low-fat) yoghurts), oral care, or consumption for pleasure are preferred.

In the uses according to the invention of a mixture comprising one or more aroma substances (as defined hereinbefore), a total amount of the alkamide or alkamides (as defined hereinbefore) to be used in accordance with the invention that is not sufficient to intensify salivation is particularly suitable.

It is particularly surprising that the aroma substances which are preferably used in the uses according to the invention have the positive property of synergistically intensifying the effect of the alkamide or alkamides (of changing, in particular of masking or reducing the unpleasant flavor impression). Accordingly, a further aspect of the present invention consists in a use as defined hereinbefore, wherein the amount used of the aroma substance or substances synergistically intensifies the effects, changing, in particular masking or reducing the unpleasant flavor impression of an unpleasant-tasting substance or mixture of substances, of the alkamide or alkamides.

In tests carried out by the Applicant, such synergistic intensification occurred in particular when the ratio by weight of the total amounts of alkamides and aroma substances to be used in accordance with the invention lay in the range of from 1:2 to 1:200, preferably in the range of from 1:3 to 1:100, particularly preferably in the range of from 1:5 to 1:70. Corresponding mixtures are preferred.

In addition, the tests which were carried out revealed that in the uses according to the invention of mixtures containing as defined hereinbefore one or more aroma substances, the one or more aroma substances are preferably selected from the group consisting of alcohols, aldehydes, ketones, organic acids, esters, lactones, sulfur components, acetals, phenols, furans, pyrans and pyrazines. Further examples of preferred aroma substances are given hereinafter.

According to a further aspect, the present invention also relates to the above-defined use in a pharmaceutical preparation intended to be ingested orally or a preparation used for nutrition (in particular soy-based products and fat-reduced (low-fat) yoghurts), oral care, or consumption for pleasure.

As mentioned several times hereinbefore, various aspects of the present invention relate to the use of one or more alkamides (as defined hereinbefore) for changing, in particular for masking or reducing an unpleasant flavor impression of an unpleasant-tasting substance or mixture of substances (as defined hereinbefore). As was also previously stated, the alkamides and mixtures described hereinbefore are used for use according to the invention in corresponding preparations.

The present invention therefore relates, according to a further aspect, to preparations containing, in addition to an alkamide and/or a mixture comprising or consisting of two or more different alkamides, each as defined hereinbefore, preferably one or more unpleasant-tasting substances, wherein the amount of the unpleasant-tasting substance or substances is sufficient to be perceived in a comparative preparation, which comprises no alkamide as defined above but is otherwise identical in its composition, as an unpleasant flavor, and the amount of the alkamide or alkamides (as defined hereinbefore) in the preparation is sufficient sensorially to change, in particular to mask or to reduce the unpleasant flavor impression of the unpleasant-tasting substance compared to the comparative preparation.

For preferred embodiments of the preparation according to the invention, that which was stated hereinbefore with regard to the particularly suitable alkamides and mixtures applies accordingly.

As defined hereinbefore, unpleasant-tasting substances in the sense of the invention are substances which taste astringent, dry, dusty, floury, chalky and/or metallic and substances having an accordingly long-lasting aftertaste, the astringent flavor impression in this case often being associated with the flavor impressions dry, dusty, floury, chalky and/or metallic. That which was stated hereinbefore with regard to the unpleasant-tasting substances applies in this case accordingly.

Therefore, particular preference is given to preparations of the type comprising one or more unpleasant-tasting substances (as defined above), the unpleasant-tasting substance or substances having one, two, three, four, five or all the flavor impressions astringent, dry, dusty, floury, chalky or metallic.

As was found in our tests, particular preference is given to preparations according to the invention wherein the unpleasant-tasting substance or substances are selected from the group consisting of: xanthine alkaloids, xanthines (caffeine, theobromine, theophylline and methylxanthines), alkaloids (quinine, brucine, strychnine, nicotine), phenolic glycosides (for example salicin, arbutin), flavonoid glycosides (for example neohesperidin, hesperidin, naringin, quercitrin, rutin, hyperoside, quercetin-3-O-glucoside, myricetin-3-O-glycosides), chalcones or chalcone glycosides (for example phloridzin, phloridzinxylosides), hydrolysable tannins (gallic or ellagic acid esters of carbohydrates, for example pentagalloylglucose, tannic acids), non-hydrolysable tannins (optionally galloylated catechins, gallocatechins, epigallocatechins or epicatechins and the oligomers thereof, for example proanthocyanidins or procyanidins, thearubigin), flavones (for example quercetin, taxifolin, myricetin), phenols such as for example salicin, polyphenols (for example γ-oryzanol, caffeic acid or the esters thereof (for example chlorogenic acid and isomers)), terpenoidal bitter and tanning substances (for example limonoids such as limonin or nomilin from citrus fruits, lupolones and humolones from hops, iridoids, secoiridoids), wormwood absinthe, enzian amarogentin, metallic salts (in particular potassium, magnesium and calcium salts, potassium chloride, potassium gluconate, potassium carbonate, potassium sulfate, potassium lactate, potassium glutamate, potassium succinate, potassium malate, sodium sulfate, magnesium sulfate, aluminum salts, zinc salts, tin salts, iron (II) salts, iron (III) salts, chromium (II) picolinate), pharmaceutical active ingredients (for example fluoroquinolone antibiotics, paracetamol, aspirin, β-lactam antibiotics, ambroxol, propylthiouracil [PROP], guaifenesin), vitamins (for example vitamin H, B-series vitamins such as vitamin B1, B2, B6, B12, niacin, pantothenic acid), denatonium benzoate, sucralose octaacetate, iron salts, aluminum salts, zinc salts, urea, unsaturated fatty acids, in particular unsaturated fatty acids in emulsions, bitter/astringent-tasting amino acids (for example leucine, isoleucine, valine, tryptophan, proline, histidine, tyrosine, lysine or phenylalanine) and bitter or astringent-tasting peptides or proteins (in particular peptides comprising an amino acid from the group consisting of leucine, isoleucine, valine, tryptophan, proline or phenylalanine at the N or C terminus), saponins, in particular soy saponins, isoflavonoids (in particular genistein, daidzein, genistin, daidzin, the glycosides and acylated glycosides thereof).

Substances having in particular an astringent, dry, dusty, floury, chalky and/or metallic aftertaste can be aroma substance or flavoring substances having a not unpleasant primary flavor (for example sweet, salty, spicy, sour) and/or odor, and for example pertain to the group consisting of sweeteners, sugar substitutes or aroma substances. Examples include: potassium salts (in particular potassium chloride, potassium gluconate, potassium carbonate, potassium sulfate, potassium lactate, potassium glutamate, potassium succinate, potassium malate), aspartame, acesulfame K, neotame, superaspartame, saccharin, sucralose, tagatose, monellin, steviosides, rebaudiosides, hernandulcin, thaumatin, miraculin, glycyrrhizin, glycyrrhetinic acid or the derivatives thereof, cyclamate or the pharmaceutically acceptable salts of the aforementioned compounds.

Obviously, the above-mentioned selection of the unpleasant-tasting substances which are particularly suitable for the preparations according to the invention, or of the substances having a corresponding aftertaste, applies equally to the uses according to the invention defined hereinbefore.

As mentioned hereinbefore, it is particularly surprising that the unpleasant flavor impressions of an unpleasant-tasting substance or mixture of substances (as defined hereinbefore) are markedly changed, in particular masked and/or reduced using a total amount of the alkamide or alkamides according to the invention that is (still) not sufficient to intensify salivation. Accordingly, preferred preparations are said to be preparations according to the invention, in which the total amount contained in the preparation of the alkamide or alkamides according to the invention is not sufficient to intensify salivation. In particular, the alkamides which are mentioned hereinbefore as being preferred, but most particularly alkamides according to the invention of Formula (1) are surprisingly particularly suitable in the above-mentioned embodiments of a preparation according to the invention.

Insofar as the present invention relates to preparations, said preparations are preferably an oral pharmaceutical preparation, a preparation used for nutrition, a preparation used for consumption for pleasure or a preparation used for oral hygiene.

Preparations which are used for nutrition and are soy-based products and fat-reduced (low-fat) yoghurts have proven to be particularly suitable preparations. For these products according to the invention, that which was stated hereinbefore for the preparations according to the invention applies accordingly.

As mentioned hereinbefore, preference is to be given to uses according to the invention using mixtures according to the invention also comprising one or more aroma substances (as defined above). The strikingly marked reduction in the astringent flavor of an unpleasant-tasting substance as defined above, in particular in soy-based products and fat-reduced yoghurts, was in this case particularly surprising. In this case too, the synergistic effect described hereinbefore resulting from the combination with one or more aroma substances was clearly observable.

As mentioned hereinbefore, special emphasis should be given to the aroma substances which impart a milky/creamy flavor impression and a flavor impression giving a sensation of fullness in the mouth (such as for example diacetyl, acetoin or delta lactones) and aroma substances imparting a sweet, caramel-like flavor impression which supports a sugar profile (such as for example maltol, vanillin, benzaldehyde, furansol, heliotropin).

In addition, specific mention should preferably be made of the following aroma substances: diacetyl, acetoin, benzaldehyde, furansol, heliotropin, vanillin, ethyl vanillin, ethyl vanillin isobutyrate (=3-ethoxy-4-isobutyryloxybenzaldehyde), Furaneol® (2,5-dimethyl-4-hydroxy-3(2H)-furanone) and the derivatives thereof (in this case preferably homofuraneol (=2-ethyl-4-hydroxy-5-methyl-3(2H)-furanone), homofuronol (=2-ethyl-5-methyl-4-hydroxy-3(2H)-furanone and 5-ethyl-2-methyl-4-hydroxy-3(2H)-furanone), maltol and maltol derivatives (in this case preferably ethyl maltol), coumarin and coumarin derivatives, gamma lactones (in this case preferably gamma undecalactone, gamma nonalactone, gamma decalactone), delta lactones (in this case preferably 4-methyldeltadecalactone, massoilactone, delta decalactone, tuberolactone), methyl sorbate, divanillin, 4-hydroxy-2(or 5)-ethyl-5(or 2)-methyl-3(2H)furanone, 2-hydroxy-3-methyl-2-cyclopentenone, 3-hydroxy-4,5-dimethyl-2(5H)-furanone, acetic acid isoamyl ester, butyric acid ethyl ester, butyric acid-n-butyl ester, butyric acid isoamyl ester, 3-methylbutyric acid ethyl ester, n-hexanoic acid ethyl ester, n-hexanoic acid allyl ester, n-hexanoic acid-n-butyl ester, n-octanoic acid ethyl ester, ethyl-3-methyl-3-phenyl glycidate, ethyl-2-trans-4-cis-decadienoate, 4-(p-hydroxyphenyl)-2-butanone, 1,1-dimethoxy-2,2,5-trimethyl-4-hexane, 2,6-dimethyl-5-hepten-1-al and phenylacetaldehyde.

Therefore, a further aspect of the present invention discloses preparations which are as defined above and additionally comprise one or more aroma substances which impart a milky/creamy flavor impression giving a sensation of fullness in the mouth and/or a sweet, caramel-like flavor impression and one or more solvents comprising a solid or liquid excipient, auxiliary and/or stabilizer.

Particularly suitable are in this case the preparations in which the amount contained of the aroma substance or substances synergistically intensifies the effect, changing, in particular masking or reducing, the unpleasant flavor impression, of the alkamide or alkamides. That which was stated hereinbefore applies accordingly in this case too. In this preferred embodiment of the preparation too, it was observed that even in the event of use of low total amounts of the alkamide or alkamides used, a very strong effect can be achieved in the sense of the use according to the invention. With regard to the selection of the alkamide or alkamides used and of the aroma substance or substances used in the preferred embodiments of the preparations according to the invention too, that which was stated hereinbefore applies accordingly.

The above-described preparations according to the invention, comprising one or more aroma substances (as defined above), are therefore aroma compositions according to the invention.

According to a further aspect, a preparation according to the invention is characterized in that it is present as a semi-finished product, as a fragrance, aroma substance or flavoring substance composition or as a seasoning mix.

Furthermore, preference is given to a preparation according to the invention comprising, in addition to an alkamide according to the invention or a mixture (as defined above), at least one further substance for changing, masking or reducing the unpleasant flavor impression of an unpleasant-tasting substance or mixture of substances. Accordingly, there is then a combination of at least two flavor-masking agents.

With regard to the preferred selection of the at least one further substance, reference is made to the discussion hereinafter.

It has surprisingly been found that the preparations according to the invention, which comprise one or more alkamides in very low concentrations (i.e. well below 10 ppm, preferably below 2 ppm, particularly preferably below 1 ppm, and at least 0.01 ppm, preferably at least 0.05 ppm), can reduce or even completely suppress the unpleasant flavor impression, in particular the astringent flavor impression of a large number of substances or applications, in particular of quercitrin, rutin, phloridzin, gallic or ellagic acid esters of carbohydrates (for example pentagalloylglucose), optionally galloylated catechins, gallocatechins, epigallocatechins or epicatechins, proanthocyanidins or procyanidins, thearubigin, quercetin, taxifolin, myricetin, γ-oryzanol, caffeic acid or the esters thereof (for example chlorogenic acid and isomers), metallic salts (in particular aluminum salts, zinc salts, iron (II) salts), astringent-tasting peptides or proteins (in particular peptides comprising an amino acid from the group consisting of leucine, isoleucine, valine, tryptophan, proline or phenylalanine at the N or C terminus), saponins, in particular soy saponins and isoflavonoids (in particular genistein, daidzein, genistin, daidzin, the glycosides and acylated glycosides thereof), artificial sweeteners or sugar substitutes (in particular aspartame, acesulfame K, saccharin, sucralose, tagatose, cyclamate, etc.) in a large number of applications such as for example cocoa-containing products, black or green tea-containing products, grape seed extract-containing products, red wine-containing products, fat-reduced or fat-free dairy products such as yoghurt or cheese, emulsion-based, fat-reduced fat products such as mayonnaise, margarine, soy-based applications (for example soy milk, soy protein-containing beverages, soy ice cream, etc., tofu), calorie-reduced products comprising artificial sweeteners and sugar substitutes (for example beverages, dairy products, confectionery, etc.), it being particularly advantageous that the alkamides used in accordance with the invention now have in the very low concentrations almost no inherent flavor, in particular almost no tingling or pungent or numbing sensorial impression and do not negatively influence the further, generally not unpleasant flavor qualities, in particular even positively influence the sweet flavor of sweet substances. As a result of the described effect, the mouth feel is significantly improved in the corresponding applications.

Therefore, particular preference is given to preparations according to the invention containing, based on their total weight, less than 10 ppm, preferably less than 2 ppm, particularly preferably less than 1 ppm and at least 0.01 ppm, preferably at least 0.05 ppm of the alkamide or alkamides (as defined hereinbefore).

The Aforementioned Preferred Concentration Ranges of the Alkamides Also Apply to the Above-Described Embodiments of Uses According to the Invention.

As mentioned hereinbefore, the present invention discloses preparations which are present in accordance with the invention as an oral pharmaceutical preparation, a preparation used for nutrition, a preparation used for consumption for pleasure or a preparation used for oral hygiene. For corresponding preferred embodiments, that which was stated hereinbefore applies accordingly.

If the preparation according to the invention is a preparation used for nutrition, it is furthermore preferred if the preparation contains, based on its total weight, less than 10 ppm, preferably less than 2 ppm and particularly preferably less than 0.5 ppm and at least 0.01 ppm, preferably at least 0.05 ppm of the alkamide or alkamides (as defined hereinbefore).

Pharmaceutical preparations comprise a pharmaceutical active ingredient. Advantageous pharmaceutical active ingredients are for example corticosteroid-type steroidal anti-inflammatory substances such as for example hydrocortisone, hydrocortisone derivatives such as hydrocortisone-17-butyrate, dexamethasone, dexamethasone phosphate, methylprednisolone or cortisone.

Advantageous nonsteroidal pharmaceutical active ingredients include for example anti-inflammatory agents such as oxicams such as piroxicam or tenoxicam; salicylates such as Aspirin® (acetylsalicylic acid), disalcid, solprin or fendosal; acetic acid derivatives such as diclofenac, fenclofenac, indomethacin, sulindac, tolmetin, or clindanac; fenamates such as mefenamic, meclofenamic, flufenamic or niflumic; propionic acid derivatives such as ibuprofen, naproxen, flurbiprofen, benoxaprofen or pyrazoles such as phenylbutazone, oxyphenylbutazone, feprazone or azapropazone.

Particularly preferred pharmaceutical preparations are non-prescription products and freely available pharmaceutical compositions, known as OTC ("over the counter") preparations, containing active ingredients such as paracetamol, acetylsalicylic acid or ibuprofen, vitamins (for example vitamin H, B-series vitamins such as vitamin B1, B2, B6, B12, niacin, pantothenic acid (preferably in the form of (effervescent) tablets or capsules), minerals (preferably in the form of (effervescent) tablets or capsules) such as iron salts, zinc salts, selenium salts, products containing active ingredients or extracts of ribwort (for example in cough syrup) or St. John's wort.

Preparations used for nutrition, or consumption for pleasure in the sense of the invention include for example baked goods (for example bread, dry biscuits, cakes, other pastries), confectionery (for example chocolates, chocolate bar products, other bar products, fruit gums, hard and soft caramels, chewing gum), alcoholic or non-alcoholic beverages (for example cocoa, coffee, green tea, black tea, (green, black) tea beverages enriched with (green, black) tea extracts, rooibos tea, other herbal teas, wine, wine-containing beverages, beer, beer-containing beverages, liqueurs, schnapps, brandies, fruit-containing lemonades, isotonic beverages, soft drinks, nectars, fruit and vegetable juices, fruit or vegetable juice preparations), instant beverages (for example instant cocoa beverages, instant tea beverages, instant coffee beverages), meat products (for example ham, fresh sausage or uncured sausage preparations, spiced or marinated fresh or cured meat products), eggs or egg products (dried egg, egg white, egg yolk), cereal products (for example breakfast cereals, muesli bars, precooked ready-to-eat rice products), dairy products (for example full-fat or fat-reduced or fat-free milk beverages, rice pudding, yoghurt, kefir, cream cheese, soft cheese, hard cheese, dried milk powder, whey, butter, buttermilk, products containing partially or completely hydrolyzed milk protein), products made of soy protein or other soy bean fractions (for example soy milk and products produced therefrom, beverages containing isolated or enzymatically treated soy protein, beverages containing soy flour, soy lecithin-containing preparations, fermented products such as tofu or tempeh or products produced therefrom and mixtures with fruit preparations and optionally aromas), fruit preparations (for example jams, fruit ice cream, fruit sauces, fruit fillings), vegetable preparations (for example ketchup, sauces, dried vegetables, deep-frozen vegetables, precooked vegetables, vegetable preserves), nibbles (for example baked or fried potato chips or potato dough products, maize or peanut-based extrudates), fat and oil-based products or emulsions thereof (for example mayonnaise, remoulade, dressings, in each case full-fat or fat-reduced), other ready meals and soups (for example dried soups, instant soups, precooked soups), spices, seasoning mixes and in particular seasonings used for example in the snack sector, sweetener preparations, tablets or sachets, other preparations for sweetening or whitening beverages or other food products. The preparations in the sense of the invention can also serve as a semifinished product for producing further preparations used for nutrition, or consumption for pleasure.

The preparations in the sense of the invention, which contain unpleasant-tasting substances or mixtures of substances, can also be in the form of capsules, tablets (non-coated and coated tablets, for example gastric juice-resistant coatings), dragées, granules, pellets, solid mixes, dispersions in liquid phases, as emulsions, as powders, as solutions, as pastes or as other swallowable or chewable preparations and as a preparation with functional ingredients, as dietary supplements or as balanced diets.

Preference is given to astringent-tasting preparations such as for example cocoa, green tea, black tea, (green, black) tea beverages enriched with (green, black) tea extracts, rooibos tea, other herbal teas, wine, wine-containing beverages, instant beverages (for example instant cocoa beverages, instant tea beverages, instant coffee beverages), fat-reduced or fat-free milk beverages, rice pudding, yoghurt, kefir, cream cheese, soft cheese, hard cheese, dried milk powder, whey, butter, buttermilk, products containing partially or completely hydrolyzed milk protein, products made of soy protein or other soy bean fractions (for example soy milk and products produced therefrom, beverages containing isolated or enzymatically treated soy protein, beverages containing soy flour, soy lecithin-containing preparations, fermented products such as tofu or tempeh or products produced therefrom and mixtures with fruit preparations and optionally aromas), fat-reduced fat and oil-based products or emulsions thereof (for example mayonnaise, remoulade, dressings), products additionally containing sweeteners such as calorie-reduced or calorie-free beverages, above all alcohol-free soft drinks, instant beverages, sugar-free or low-sugar ice cream, dairy products, baked goods, sweets, chocolate, products containing soy milk or soy protein.

As mentioned several times hereinbefore, the above-defined preparations are, according to one aspect of the present invention, in particular (i) soy-based products and (ii) fat-reduced (low-fat) yoghurts as defined above and having an astringent flavor. In these products, the successful masking according to the invention is particularly distinct.

Preparations used for oral care in the sense of the invention include in particular oral and/or dental care agents such as toothpastes, dental gels, dental powders, mouthwashes, chewing gums and other oral care agents.

Dental care agents (preparations serving as a basis for oral care) containing the alkamides to be used in accordance with the invention generally comprise an abrasive system (grinding or polishing agents) such as for example silicas, calcium carbonates, calcium phosphates, aluminum oxides and/or hydroxylapatites, surface-active substances such as for example sodium lauryl sulfate, sodium lauryl sarcosinate and/or cocamidopropyl betaine, humectants such as for example glycerol and/or sorbitol, thickeners such as for example carboxymethylcellulose, polyethylene glycols, carrageenan and/or Laponite®, sweeteners such as for example saccharin, other flavor-masking agents for unpleasant flavor impressions, flavor-masking agents for further, generally not unpleasant flavor impressions, flavor-modulating substances (for example inositol phosphate, nucleotides such as guanosine monophosphate, adenosine monophosphate or other substances such as sodium glutamate or 2-phenoxypropionic acid), cooling agents such as for example menthol, menthol derivatives (for example L-menthol, L-menthyl lactate, L-menthyl alkyl carbonates, menthone ketals, menthane carboxylic acid amides), 2,2,2-trialkyl acetic acid amides (for example 2,2-diisopropylpropionic acid methylamides), icilin derivatives, stabilizers and active ingredients such as for example sodium fluoride, sodium monofluorophosphate, tin difluoride, quaternary ammonium fluorides, zinc citrate, zinc sulfate, tin pyrophosphate, tin dichloride, mixtures of various pyrophosphates, triclosan, cetylpyridinium chloride, aluminum lactate, potassium citrate, potassium nitrate, potassium chloride, strontium chloride, hydrogen peroxide, aromas and/or sodium bicarbonate or odor-masking agents.

Chewing gums (as a further example of preparations used for oral care) containing alkamides to be used in accordance with the invention generally comprise a chewing gum base, i.e. a masticatory substance which becomes plastic during chewing, sugars of various types, sugar substitutes, sweeteners, sugar alcohols, other flavor-masking agents for unpleasant flavor impressions, flavor-masking agents for further, generally not unpleasant flavor impressions, flavor-modulating substances (for example inositol phosphate, nucleotides such as guanosine monophosphate, adenosine monophosphate or other substances such as sodium glutamate or 2-phenoxypropionic acid), the cooling agents, humectants, thickeners, emulsifiers, aromas and stabilizers or odor-masking agents mentioned in the foregoing section.

Preferably, the preparations according to the invention can also contain an aroma composition in order to round off and to refine the flavor and/or smell of the preparation. Suitable aroma compositions contain for example synthetic, natural or nature-identical aroma substances, fragrances and flavoring substances and suitable auxiliaries and excipients.

The further constituents used for preparations according to the invention can be conventional primary materials, auxiliaries and additives for food or luxury food products. Some of these substances have an unpleasant flavor in the sense of the definition given at the outset.

Further conventional active ingredients, primary materials, auxiliaries and additives for preparations used for nutrition, oral care, or consumption for pleasure can be contained in amounts of from 5 to 99.999999% by weight, preferably 10 to 80% by weight, based on the total weight of the preparation. Furthermore, the preparations can comprise water in an amount of up to 99.999999% by weight, preferably 5 to 80% by weight, based on the total weight of the preparation.

Examples of conventional primary materials, auxiliaries and additives for preparations according to the invention include water, mixtures of fresh or processed, vegetable or animal primary or raw materials (for example raw, pan-fried, dried, fermented, smoked and/or boiled meat, bones, gristle, fish, vegetables, fruits, herbs, nuts, vegetable or fruit juices or pastes or mixtures thereof), digestible or non-digestible carbohydrates (for example saccharose, maltose, fructose, glucose, dextrins, amylose, amylopectin, inulin, xylans, cellulose), sugar alcohols (for example sorbitol), natural or hardened fats (for example tallow, lard, palm fat, coconut fat, hardened vegetable fat), oils (for example sunflower oil, peanut oil, maize germ oil, olive oil, fish oil, soy oil, sesame oil), fatty acids or salts thereof (for example potassium stearate), proteinogenic or non-proteinogenic amino acids and related compounds (for example taurine), peptides, native or processed proteins (for example gelatin), enzymes (for example peptidases), nucleic acids, nucleotides, flavor-masking agents other than those used in accordance with the invention for unpleasant flavor impressions (for example hesperetin, phloretin or other hydroxy chalcone derivatives to be used in accordance with US 2008/0227867 and optionally the lactones described therein), flavor-masking agents for further, generally not unpleasant flavor impressions, flavor-modulating substances (for example inositol phosphate, nucleotides such as guanosine monophosphate, adenosine monophosphate or other substances such as sodium glutamate or 2-phenoxypropionic acid), emulsifiers (for example lecithins, diacylglycerols), stabilizers (for example carrageenan, alginate), preservatives (for example benzoic acid, sorbic acid), antioxidants (for example tocopherol, ascorbic acid), chelators (for example citric acid), organic or inorganic acidifying agents (for example malic acid, acetic acid, citric acid, tartaric acid, phosphoric acid, lactic acid), additional bitter substances (for example quinine, caffeine, limonin, amarogentin, humolones, lupolones, catechins, tannins), sweeteners (for example saccharin, cyclamate, aspartame, neotame, steviosides, rebaudiosides, acesulfame K, neohesperidin dihydrochalcone, thaumatin, superaspartame), mineral salts (for example sodium chloride, potassium chloride, magnesium chloride, sodium phosphates), substances preventing enzymatic browning (for example sulfite, ascorbic acid), essential oils, plant extracts, natural or synthetic colorants or coloring pigments (for example carotenoids, flavonoids, anthocyans, chlorophyll and the derivatives thereof), spices, trigeminally (i.e. pungent, acrid, prickling, tickling, astringent, hot or cold effects-causing) active substances or plant extracts containing trigeminally active substances of this type, synthetic, natural or nature-identical aroma substances or fragrances and odor-masking agents.

The present invention further relates to a method for changing, in particular masking or reducing the unpleasant flavor impression of an unpleasant-tasting substance or mixture of substances. In this case, an unpleasant-tasting substance (as defined above) is mixed with an alkamide and/or a mixture comprising or consisting of two or more different alkamides (as defined hereinbefore). With regard to the selection of the alkamide or alkamides or the mixtures according to the invention and the unpleasant-tasting substances, that which was stated hereinbefore applies accordingly.

In a particularly preferred embodiment, the alkamide or alkamides (as defined above) are mixed in the above-mentioned method with an unpleasant-tasting substance having an astringent flavor (as defined hereinbefore).

The described preparations according to the invention, comprising one or more of the alkamides used in accordance with the invention, are preferably produced in that the alkamides are incorporated as substances, as a solution or in the form of an aroma mix into a base preparation used for nutrition, oral care, or consumption for pleasure, or an oral pharmaceutical base preparation. Advantageously, preparations according to the invention in the form of a solution can also be transformed into a solid preparation, for example by spray drying.

According to a further preferred embodiment, for producing preparations according to the invention, the alkamide or alkamides used in accordance with the invention and optionally other constituents of the preparation according to the invention are incorporated in the form of emulsions, in liposomes, for example starting from phosphatidylcholine, in microspheres, in nanospheres or else in capsules, granules or extrudates made up of a matrix suitable for food and luxury food products, for example of starch, starch derivatives, cellulose or cellulose derivatives (for example hydroxypropyl cellulose), other polysaccharides (for example alginate), natural fats, natural waxes (for example beeswax, carnauba wax) or of proteins, for example gelatin. In a preferred production process, the alkamides or mixtures to be used in accordance with the invention are complexed, prior to the incorporation, with one or more suitable complexing agents, for example with cycloglycans, for example cyclofructans, cyclodextrins or cyclodextrin derivatives, preferably $\alpha$, $\gamma$ and $\beta$-cyclodextrin, and used in this complexed form.

Particularly preferred is a preparation according to the invention in which the matrix is selected in such a way that the alkamides to be used in accordance with the invention are released from the matrix in a delayed manner, thus providing a long-lasting effect.

EXAMPLES

The examples serve to illustrate the invention, without restricting the scope of protection of the claims. Unless otherwise indicated, all percentages relate to weight.

Application Example 1

Aroma Compositions, Liquid

| Ingredient | Preparation (amount used in % by weight) | | | | | | | |
|---|---|---|---|---|---|---|---|---|
| | A | B | C | D | E | F | G | H |
| 10% by weight of trans-pellitorine in 1,2-propylene glycol/diethyl malonate | 1 | 0.6 | 1 | 0.55 | 1.95 | 1 | 0.25 | 1.6 |
| Hesperetin | 2 | — | — | 2 | — | — | — | — |
| Symrise sugar aroma in propylene glycol-1,2 | 1.5 | 4 | — | — | 2 | — | 0.3 | — |
| Symrise milk aroma in propylene glycol-1,2 | — | — | — | 4 | — | — | — | — |
| Symrise cream aroma in propylene glycol-1,2 | — | — | 3 | 0.3 | 0.5 | 5 | 1 | 2.5 |
| Propylene glycol | Ad 100 | — | Ad 100 | Ad 100 | Ad 100 | Ad 100 | — | Ad 100 |
| Ethanol | — | ad 100 | — | — | — | — | Ad 100 | — |

The substances and solutions are mixed in the above-specified quantitative ratios and then taken up with propylene glycol or ethanol and completely dissolved by gentle heating and mixed homogeneously.

Application Example 2

Aroma Compositions, Dry

| Ingredient | Preparation (amount used in % by weight) | | | | | | | |
|---|---|---|---|---|---|---|---|---|
| | A | B | C | D | E | F | G | H |
| approx. 1,3% by weight of pellitorine, spray-dried | 25 | 15 | 0.5 | 1 | 1 | 0.25 | 1.2 | 6 |
| approx. 10% by weight of homoeriodictyol, spray-dried | — | — | 35 | 50 | 45 | 15 | 13 | 50 |
| approx. 10% by weight of hesperetin, spray-dried | — | — | — | — | 10 | 10 | 6 | — |
| Symrise rounding aroma for tea, spray-dried | — | — | 1 | — | 30 | 5 | — | — |
| Symrise sugar aroma in triacetin | 8 | 5 | 0.5 | — | — | — | — | — |
| Symrise vanilla, spray-dried | — | — | — | — | — | — | 3 | 10 |
| Dextrose, anhydrous | — | Ad 100 | — | — | — | Ad 100 | — | — |
| Maltodextrin | Ad 100 | — | Ad 100 | Ad 100 | Ad 100 | — | Ad 100 | Ad 100 |

Application Example 3

Spray-Dried Aroma Compositions as Semifinished Products for Aromatizing Finished Products

| Ingredient | Preparation (amount used in % by weight) | | | | | |
|---|---|---|---|---|---|---|
| | A | B | C | D | E | F |
| Maltodextrin from wheat | 24.3 | 24.3 | 24.3 | 24.3 | 24.3 | 24.3 |
| Gum arabic | 6.1 | 6.1 | 6.1 | 6.1 | 6.1 | 6.1 |
| Trans-pellitorine | 0.1 | 0.08 | 0.04 | 0.06 | 0.1 | 0.1 |
| Symrise sugar aroma in triacetin | — | 0.5 | 0.2 | — | 0.1 | — |
| Symrise cream aroma in triacetin | — | — | — | 0.05 | 0.05 | — |
| Symrise milk aroma in triacetin | — | — | — | — | — | 0.1 |
| Drinking water | ad 100 | ad 100 | ad 100 | ad 100 | ad 100 | ad 100 |

The drinking water is placed in a container and the maltodextrin and the gum arabic dissolved therein. Subsequently, constituents are emulsified into the above-described excipient solution using a mixer (Turrax). The temperature of the resulting mix should not exceed 30° C. The mix is then spray-dried (target temperature, input: 185-195° C., target temperature, output: 70-75° C.). Similarly, spray-dried preparations can also be produced using other aroma compositions according to the invention.

Application Example 4

Aroma Mixes for Reducing the Unpleasant Flavor Impressions in a Sweetener Mix for Sweetening Cocoa, Coffee or Tea-Containing Beverages Comparative Preparation (A)

Preparation according to the invention containing aroma compositions according to the invention (B-D)

| Ingredient | Preparation (particulars as % by weight) | | | |
|---|---|---|---|---|
| | A | B | C | D |
| Saccharin | 1.50 | 1.50 | 1.50 | 1.50 |
| Aroma composition according to Application Example 2 B | — | 1.7 | — | 0.6 |
| Aroma composition according to Application Example 2 A | — | — | — | 1.00 |
| Aroma composition according to Application Example 3 B | — | — | 1.00 | — |
| Sorbitol | ad 100 | ad 100 | ad 100 | ad 100 |

1% of preparations A-D is added to black coffee (freshly brewed).

Compared to preparation A (comparison), in preparations B-D the astringency and the long-lasting sweetness were reduced. The metallic notes were also reduced. In addition, preparation D had a typical sucrose flavor.

Application Example 5

Use in a Sweetener Mix for Sweetening Fat-Reduced, Low-Fat or Fat-Free Dairy Products (for Example Ice Cream, Yoghurt, Etc.) for Reducing the Unpleasant Flavor Impressions Comparative Preparation (A)

Preparation according to the invention containing aroma compositions according to the invention (B-D)

| Ingredient | Preparation (particulars as % by weight) | | | |
|---|---|---|---|---|
| | A | B | C | D |
| Aroma composition according to Application Example 1 E | — | 0.03 | — | — |
| Aroma composition according to Application Example 1 A | — | — | — | 0.08 |
| Aroma composition according to Application Example 1 H | — | — | 0.03 | — |
| Acesulfame K | 0.01 | 0.01 | 0.01 | 0.01 |
| Aspartame | 0.02 | 0.02 | 0.02 | 0.02 |
| Natural yoghurt, 0.1% fat | ad 100 | ad 100 | ad 100 | ad 100 |

The aroma compositions and the sweeteners are stirred into the neutral 0.1% fat-containing yoghurt. The mixtures require a maturing time of 3 days.

Compared to preparation A (comparison), in preparations B-D the astringency and the long-lasting sweetness were reduced. The metallic notes were also reduced. In preparation C, a much stronger sensation of fullness in the mouth was achieved (reminiscent of sucrose).

Application Example 6

Use in a Soy Milk Beverage

Comparative Preparation (A)
Preparation according to the invention containing aroma compositions according to the invention (B-H)

| Ingredient | Preparation (particulars as % by weight) | | | | | | | |
|---|---|---|---|---|---|---|---|---|
| | A | B | C | D | E | F | G | H |
| Aroma composition according to Application Example 3A | 0.015 | — | — | — | — | — | — | — |
| Aroma composition according to Application Example 1 G | — | — | 0.1 | — | — | — | — | — |
| Aroma composition according to Application Example 1 F | — | 0.04 | — | — | — | — | — | — |
| Aroma composition according to Application Example 1 C | — | — | — | 0.01 | — | — | 0.005 | — |
| Aroma composition according to Application Example 1 A | — | — | — | — | — | 0.1 | — | — |
| Aroma composition according to Application Example 1 D | — | — | — | — | 0.15 | — | 0.1 | — |
| Aroma composition according to Application Example 3 E | — | — | — | — | — | — | — | 0.015 |
| Soy milk, without additives (local supermarket) | ad 100 | ad 100 | ad 100 | ad 100 | ad 100 | ad 100 | ad 100 | ad 100 |

The aroma compositions are mixed with the neutral soy milk. The mixtures require a maturing time of 5-6 days.

Compared to preparation A (comparison), in preparations B-H the astringency of the soy milk was reduced. In preparations B-D and G+H, the sensation of fullness in the mouth of the soy milk was significantly improved, the soy bean notes were reduced. In preparation E+F, in addition to the astringency, the bitterness of the soy milk was in particular reduced.

Application Example 7

Use in a Soy Beverage in Combination with γ-Aminobutyric Acid

γ-Aminobutyric acid was predissolved in water and added, together with a (pellitorine-containing) aroma mix, to soy milk from a local supermarket. The mixture was stirred together with the milk aroma in a beaker glass.

| Ingredient | Amount used in % by weight |
|---|---|
| Soy milk, without additives (local supermarket) | 99.76 |
| Aroma composition according to Application Example 1 F | 0.04 |
| 1% γ-Aminobutyric acid in water | 0.2 |

Compared to Application Example 6B, the astringency was significantly reduced; the soy milk obtains a very neutral freshness.

Application Example 8

Use in a Soy Fruit Beverage

Comparative Preparation (A)
Preparation according to the invention containing aroma compositions according to the invention (B-D)

| Ingredient | Preparation (particulars as % by weight) | | | |
|---|---|---|---|---|
| | A | B | C | D |
| Aroma composition according to Application Example 1 D | — | 0.12 | 0.1 | — |
| Aroma composition according to Application Example 1 A | — | — | — | 0.08 |
| Aroma composition according to Application Example 1 C | — | — | 0.003 | — |
| Sweetener mix | 0.03 | 0.03 | 0.03 | 0.03 |
| Sugar | 5 | 5 | 5 | 5 |
| Fruit juice mix made up of fruit juice concentrates | 50 | 50 | 50 | 50 |
| Water | ad 100 | ad 100 | ad 100 | ad 100 |
| Soy powder | 5 | 5 | 5 | 5 |

The aroma compositions are mixed with the remaining ingredients. The mixture is homogenized and subsequently pasteurized (15 min at 80-85° C.).

Compared to preparation A (comparison), in preparations B-D the astringency and the soy bean notes were reduced. In preparation B, the bitterness was also greatly reduced. All samples had a much fruitier flavor.

Application Example 9

Use in a Soy Ice Cream

Comparative Preparation (A)
Preparation according to the invention containing aroma compositions according to the invention (B-D)

| Ingredient | Preparation (particulars as % by weight) | | | |
|---|---|---|---|---|
| | A | B | C | D |
| Aroma composition according to Application Example 1 F | — | 0.06 | — | — |
| Aroma composition according to Application Example 1 G | — | — | — | 0.12 |
| Aroma composition according to Application Example 1 C | — | — | 0.014 | — |
| Soy ice cream mix (comprising 12% saccharose, 8% glucofructose syrup, 3% soy powder, 4.5% fat) | ad 100 | ad 100 | ad 100 | ad 100 |

The aroma compositions are mixed with the ice cream mix. Subsequently, the mass is frozen in a freezer at 100% impingement and stored at −25° C.

Compared to preparation A (comparison), in preparations B-D the soy bean notes were greatly reduced.

Application Example 10

Use in a Fat-Free Yoghurt

Comparative Preparation (A)
Preparation according to the invention containing aroma compositions according to the invention (B-D)

| Ingredient | Preparation (particulars as % by weight) | | | |
|---|---|---|---|---|
| | A | B | C | D |
| Aroma composition according to Application Example 1 F | — | 0.03 | — | — |
| Aroma composition according to Application Example 1 G | — | — | — | 0.1 |
| Aroma composition according to Application Example 3 F | — | — | 0.015 | — |
| Sucrose | 5 | 5 | 5 | 5 |
| Natural yoghurt, 0.1% fat | ad 100 | ad 100 | ad 100 | ad 100 |

The aroma compositions and the sucrose are stirred into the neutral 0.1% fat-containing yoghurt. The mixtures require a maturing time of 3 days.

Compared to preparation A (comparison), in preparations B-D the astringency was reduced. The sourness of the yoghurt was also reduced. In preparation D, a much stronger sensation of fullness in the mouth was achieved.

Application Example 11

Use in a Fat-Reduced Mayonnaise

| Ingredient | Amount used in % by weight |
|---|---|
| Fat-reduced mayonnaise | 99.93 |
| Aroma composition according to Application Example 1 F | 0.07 |

Compared to fat-reduced mayonnaise without an aroma composition, the astringency was improved; the preparation contained a better mouth feel/fatness.

Application Example 12

Green Tea-Preparations

| Ingredient | Amount used in % by weight | |
|---|---|---|
| | A | B |
| Green tea extract, approx. 16% catechin content | 0.25 | 0.25 |
| Aroma composition according to Application Example 2 D | 0.1 | — |
| Aroma composition according to Application Example 2 E | — | 0.1 |
| Sweetener mix (aspartame, sucralose 1:1) | 0.01 | 0.01 |
| Malic acid, citric acid | 0.1 | 0.1 |
| Demineralized water | ad 100 | ad 100 |

The green tea extract, acid and sweetener mix and the aroma compositions were dissolved in 80'-hot water and decanted into bottles.

Compared to the control green tea preparation (without an aroma composition), the astringency was reduced. The bitterness was also reduced, especially in preparation B; preparation B displayed a much fuller sweetness.

Application Example 13

Use in a Bitter Chocolate

| Ingredient | Amount used in % by weight |
|---|---|
| Bitter chocolate, min. 85% cocoa (commercial product) | 99.7 |
| Aroma composition according to Application Example 2 G | 0.3 |

The ingredients were incorporated into the chocolate, which was melted at 40° C., and the liquid mass was poured into bar form and cooled using the tempering method known to a person skilled in the art, thus providing an eating chocolate.

The chocolate thus prepared was described by trained experts as being less bitter, less astringent and overall as being better rounded.

Specific Embodiments

Specific embodiment one comprises a use
of an individual alkamide
and/or
  a mixture comprising or consisting of two or more different alkamides,
  wherein the individual alkamide or one, a plurality of or all the alkamides in the mixture are selected from the group consisting of 2E,4E-decadienoic acid-N-isobutylamide (trans-pellitorine), 2E,4Z-decadienoic acid-N-isobutylamide (cis-pellitorine); 2Z,4Z-decadienoic acid-N-isobutylamide; 2Z,4E-decadienoic acid-N-isobutylamide; 2E,4E-decadienoic acid-N-([2S]-2-methylbutyl)amide; 2E,4E-decadienoic acid-N-([2S]-2-methylbutyl)amide; 2E,4E-decadienoic acid-N-([2R]-2-methylbutylamide); 2E,4Z-decadienoic acid-N-(2-methylbutyl)amide; 2E,4E-decadienoic acid-N-piperide (achilleamide); 2E,4E-decadienoic acid-N-piperide (sarmentine); 2E-decenoic acid-N-isobutylamide; 3E-decenoic acid-N-isobutylamide; 3E-nonenoic acid-N-isobutylamide; 2E,6Z,8E-decatrienoic acid-N-isobutylamide (spilanthol); 2E,6Z,8E-decatrienoic acid-N-([2S]-2-methylbutyl)amide (homospilanthol); 2E,6Z,8E-decatrienoic acid-N-([2R]-2-methylbutyl)amide; 2E-decen-4-oic acid-N-isobutylamide; 2Z-decen-4-oic acid-N-isobutylamide; 2E,6Z,8E,10E-dodecatetraenoic acid-N-(2-methylpropyl)amide (α-sanshool); 2E,6Z,8E,10E-dodecatetraenoic acid-N-(2-hydroxy-2-methylpropyl)amide (α-hydroxysanshool); 2E,6E,8E,10E-dodecatetraenoic acid-N-(2-hydroxy-2-methylpropyl)amide (γ-hydroxysanshool); 2E,4E,8Z,10E,12E-tetradecapentaenoic acid-N-(2-hydroxy-2-methylpropyl)amide (γ-hydroxysanshool); 2E,4E,8E,10E,12E-tetradecapentaenoic acid-N-(2-hydroxy-2-methylpropyl)amide (γ-hydroxyisosanshool); 2E,4E,8Z,10E,12E-tetradecapentaenoic acid-N-(2-methyl-2-propenyl)amide (γ-dehydrosanshool); 2E,4E,8Z,10E,12E-tetradecapentaenoic acid-N-(2-methylpropyl)amide (γ-sanshool); 2E,4E,8Z,11Z-tetradecatetraenoic acid-N-(2-hydroxy-2-methylpropyl)amide (bungeanool); 2E,4E,8Z,11E-tetradecatetraenoic acid-N-(2-hydroxy-2-methylpropyl)amide (isobungeanool); 2E,4E,8Z-tetradecatrienoic acid-N-(2-hydroxy-2-methylpropyl)amide (dihydrobungeanool) and 2E,4E-tetradecadienoic acid-N-(2-hydroxy-2-methylpropyl)amide (tetrahydrobungeanool),
for changing, masking or reducing the unpleasant flavor impression of an unpleasant-tasting substance or mixture of substances.

Specific embodiment two comprises the use as in specific embodiment one, wherein the alkamide or the alkamides are each independently of one another selected from the group consisting of 2E,4E-decadienoic acid-N-isobutylamide (trans-pellitorine), 2E,4Z-decadienoic acid-N-isobutylamide (cis-pellitorine), 2Z,4Z-decadienoic acid-N-isobutylamide, 2Z,4E-decadienoic acid-N-isobutylamide, 2E,4E-decadienoic acid-N-piperide (achilleamide), 2E,6Z,8E-decatrienoic acid-N-isobutylamide (spilanthol), 2E,6Z,8E-decatrienoic acid-N-([2S]-2-methylbutyl)amide (homospilanthol), 2E,6Z,8E-decatrienoic acid-N-([2R]-2-methylbutyl)amide, 2E,6Z,8E,10E-dodecatetraenoic acid-N-(2-methylpropyl)amide (α-sanshool), 2E,6Z,8E,10E-dodecatetraenoic acid-N-(2-hydroxy-2-methylpropyl)amide (α-hydroxysanshool), 2E,4E,8Z,10E,12E-tetradecapentaenoic acid-N-(2-methylpropyl)amide (γ-sanshool) and 2E,4E,8Z,11Z-tetradecatetraenoic acid-N-(2-hydroxy-2-methylpropyl)amide (bungeanool).

Specific embodiment three comprises the use as in specific embodiment one, wherein the alkamide or the alkamides are each independently of one another selected from the group consisting of 2E,4E-decadienoic acid-N-isobutylamide (trans-pellitorine) of Formula (1), 2E,4Z-decadienoic acid-N-isobutylamide (cis-pellitorine) of Formula (2), 2Z,4Z-decadienoic acid-N-isobutylamide of Formula (3) and 2Z,4E-decadienoic acid-N-isobutylamide of Formula (4):

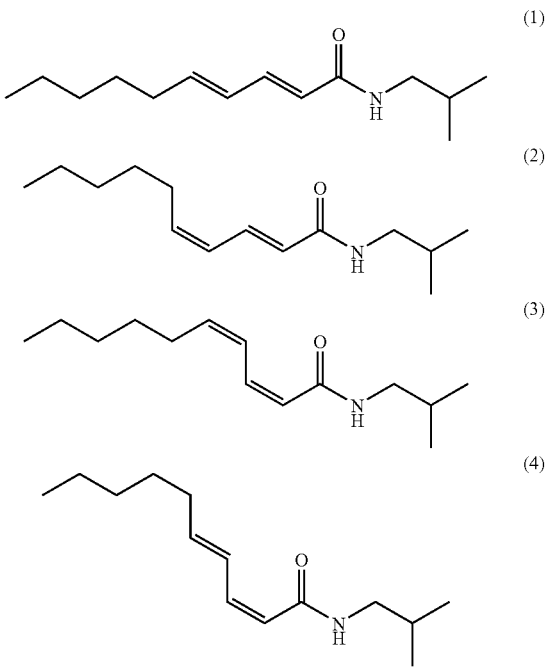

Specific embodiment four comprises the use as in any one of the preceding specific embodiments for changing, masking or reducing an astringent flavor of an unpleasant-tasting substance or mixture of substances with one, two, three, four, five or all the flavor impressions astringent, dry, dusty, floury, chalky or metallic.

Specific embodiment five comprises the use as in any one of the preceding specific embodiments, wherein the total amount, used for changing, masking or reducing the unpleasant flavor impression, of the alkamide or alkamides is not sufficient to intensify salivation.

Specific embodiment six comprises the use as in any one of the preceding specific embodiments in a pharmaceutical preparation intended to be ingested orally or a preparation used for nutrition, oral care, or consumption for pleasure.

Specific embodiment seven comprises the use as in specific embodiment six, wherein the preparation used for nutrition is selected from the group consisting of soy-based products and fat-reduced (low-fat) yoghurts.

Specific embodiment eight comprises the use of an individual alkamide or of two or more different alkamides as in any one of specific embodiments one to three, mixed with one or more aroma substances which impart a milky/creamy flavor impression giving a sensation of fullness in the mouth and/or a sweet, caramel-like flavor impression.

Specific embodiment nine comprises the use as in specific embodiment eight, wherein the amount used of the aroma substance or substances synergistically intensifies the effect, changing, masking or reducing the unpleasant flavor impression, of the alkamide or alkamides.

Specific embodiment ten comprises a preparation comprising
a)
   an alkamide
and/or
   a mixture comprising or consisting of two or more different alkamides
as defined in any one of specific embodiments one to three
and
b) one or more unpleasant-tasting substances,
wherein
the amount of the unpleasant-tasting substance or substances is sufficient to be perceived in a comparative preparation, which comprises no alkamide as defined in any one of specific embodiments one to three but is otherwise identical in its composition, as an unpleasant flavor, and the amount of the alkamide or alkamides as defined in any one of specific embodiments one to three in the preparation is sufficient sensorially to change, to mask or to reduce, compared to the comparative preparation, the unpleasant flavor impression of the unpleasant-tasting substance.

Specific embodiment eleven comprises the preparation as in specific embodiment ten, wherein the unpleasant-tasting substance or substances have one, two, three, four, five or all the flavor impressions astringent, dry, dusty, floury, chalky or metallic.

Specific embodiment twelve comprises the preparation as in specific embodiment ten or eleven, wherein the unpleasant-tasting substance or substances are selected from the group consisting of: xanthine alkaloids, xanthines, alkaloids, phenolic glycosides, flavonoid glycosides, bitter-tasting chalcones or chalcone glycosides, hydrolysable tannins, non-hydrolysable tannins, flavones, phenols, polyphenols, terpenoidal bitter and tanning substances, wormwood absinthe, enzian amarogentin, metallic salts, pharmaceutical active ingredients, vitamins, denatonium benzoate, sucralose octaacetate, iron salts, aluminum salts, zinc salts, urea, unsaturated fatty acids, bitter-tasting amino acids and bitter or astringent-tasting peptides or proteins, saponins, isoflavonoids.

Specific embodiment thirteen comprises the preparation as in any one of specific embodiments ten to twelve, wherein the total amount contained in the preparation of the alkamide or alkamides is not sufficient to intensify salivation.

Specific embodiment fourteen comprises the preparation as in any one of specific embodiments ten to thirteen, wherein the preparation is an oral pharmaceutical preparation, a preparation used for nutrition, a preparation used for consumption for pleasure or a preparation used for oral hygiene, preferably a preparation with functional ingredients, a dietary supplement or a balanced diet.

Specific embodiment fifteen comprises the preparation as in specific embodiment fourteen, wherein the preparation used for nutrition is selected from the group consisting of soy-based products and fat-reduced (low-fat) yoghurts.

Specific embodiment sixteen comprises the preparation as in any one of specific embodiments ten to fifteen, additionally comprising
   one or more aroma substances which impart a milky/creamy flavor impression giving a sensation of fullness in the mouth and/or a sweet, caramel-like flavor impression
   and
   one or more solvents comprising a solid or liquid excipient, auxiliary and/or stabilizer.

Specific embodiment seventeen comprises the preparation as in specific embodiment sixteen, wherein the amount contained of the aroma substance or substances synergistically intensifies the effect, changing, masking or reducing the unpleasant flavor impression, of the alkamide or alkamides.

Specific embodiment eighteen comprises the preparation as in any one of specific embodiment ten to seventeen, wherein it is present as a semifinished product, as a fragrance, aroma substance or flavoring substance composition or as a seasoning mix.

Specific embodiment nineteen comprises the preparation as in any one of specific embodiments ten to eighteen, further comprising at least one further substance for changing, masking or reducing the unpleasant flavor impression of an unpleasant-tasting substance or mixture of substances.

Specific embodiment twenty comprises the preparation as in any one of specific embodiments ten to nineteen, preferably a preparation as in specific embodiment eighteen, wherein the preparation contains, based on its total weight, less than 10 ppm, preferably less than 2 ppm, and at least 0.01 ppm of the alkamide or alkamides as defined in any one of specific embodiments one to three.

Specific embodiment twenty-one comprises a method for changing, masking or reducing the unpleasant flavor impression of an unpleasant-tasting substance or mixture of substances, comprising the step of mixing an unpleasant-tasting substance or mixture of substances with
   an alkamide
and/or
   a mixture comprising or consisting of two or more different alkamides
as defined in any one of specific embodiments one to three.

Specific embodiment twenty-two comprises the method as in specific embodiment twenty-one, wherein the unpleasant-tasting substance is a substance having an astringent flavor.

It is claimed:

1. A method for masking or reducing the unpleasant flavor impression of an unpleasant-tasting substance or mixture of substances comprising mixing an astringent-tasting substance or mixture of astringent-tasting substances with 0.01 ppm to less than 10 ppm of one or more alkamides independently selected from the group consisting of:

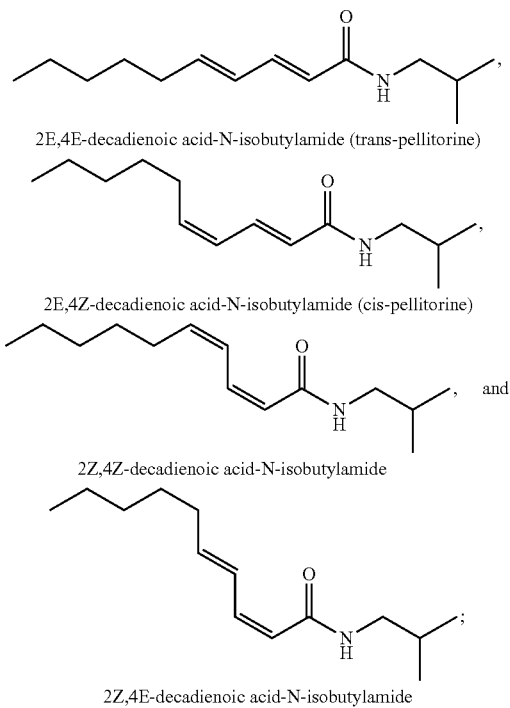

wherein the total amount of the one or more alkamides is not sufficient to intensify salivation.

2. The method as claimed in claim 1, wherein the one or more alkamides are formulated as a pharmaceutical preparation appropriate to be ingested orally or as a preparation used for nutrition, oral care, or consumption for pleasure.

3. The method as claimed in claim 2, wherein the preparation used for nutrition is selected from the group consisting of soy-based products and fat-reduced (low-fat) yoghurts.

4. The method as claimed in claim 1, wherein the one or more alkamides are mixed with one or more aroma substances which impart a milky/creamy flavor impression giving a sensation of fullness in the mouth and/or a sweet, caramel-like flavor impression.

5. The method as claimed in claim 4, wherein the amount used of the aroma substance or substances synergistically intensifies the effect, changing, masking or reducing the unpleasant flavor impression.

6. The method of claim 1, wherein the total amount of the one or more alkamides is less than 2 ppm and at least 0.01 ppm.

7. The method of claim 1, wherein the total amount of the one or more alkamides is less than 1 ppm and at least 0.01 ppm.

8. A method for masking or reducing an astringent flavor impression comprising adding 0.01 ppm to less than 10 ppm of 2E,4E-decadienoic acid-N-isobutylamide (trans-pellitorine) to a preparation comprising an astringent-tasting substance, thereby masking or reducing the astringent flavor impression of the astringent-tasting substance in the preparation, provided that the amount of 2E,4E-decadienoic acid-N-isobutylamide (trans-pellitorine) is not sufficient to intensify salivation.

9. The method as claimed in claim 8, wherein the preparation is formulated as a pharmaceutical preparation appropriate to be ingested orally or as a preparation used for nutrition, oral care, or consumption for pleasure.

10. The method as claimed in claim 9, wherein the preparation used for nutrition is selected from the group consisting of soy-based products and fat-reduced (low-fat) yoghurts.

11. The method as claimed in claim 8, wherein the 2E,4E-decadienoic acid-N-isobutylamide (trans-pellitorine) is mixed with one or more aroma substances which impart a milky/creamy flavor impression giving a sensation of fullness in the mouth and/or a sweet, caramel-like flavor impression.

12. The method as claimed in claim 11, wherein the amount used of the aroma substance or substances synergistically intensifies the effect, changing, masking or reducing the unpleasant flavor impression.

13. The method of claim 8, wherein the total amount of the 2E,4E-decadienoic acid-N-isobutylamide (trans-pellitorine) is less than 2 ppm and at least 0.01 ppm.

14. The method of claim 8, wherein the total amount of the 2E,4E-decadienoic acid-N-isobutylamide (trans-pellitorine) is less than 1 ppm and at least 0.01 ppm.

* * * * *